United States Patent
Nozawa et al.

(10) Patent No.: US 7,753,814 B2
(45) Date of Patent: Jul. 13, 2010

(54) BELT TYPE CONTINUOUSLY VARIABLE TRANSMISSION

(75) Inventors: Hirofumi Nozawa, Susono (JP); Ryuji Ibaraki, Susono (JP); Takuya Okada, Susono (JP); Yasuo Hojo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/591,181

(22) PCT Filed: Mar. 18, 2005

(86) PCT No.: PCT/IB2005/000697

§ 371 (c)(1),
(2), (4) Date: Aug. 30, 2006

(87) PCT Pub. No.: WO2005/093296

PCT Pub. Date: Oct. 6, 2005

(65) Prior Publication Data

US 2007/0249440 A1    Oct. 25, 2007

(30) Foreign Application Priority Data

Mar. 23, 2004    (JP)    ............................. 2004-085688

(51) Int. Cl.
 F16H 59/00    (2006.01)
 F16H 61/00    (2006.01)
 F16H 63/00    (2006.01)
(52) U.S. Cl. ................................ 474/28; 474/8; 474/18
(58) Field of Classification Search .................. 474/16, 474/18, 28, 29, 30, 8, 11, 12, 13, 25, 43, 474/45
See application file for complete search history.

(56) References Cited

U.S. PATENT DOCUMENTS

| 4,060,012 | A |   | 11/1977 | Giacosa |
| 5,006,092 | A | * | 4/1991  | Neuman et al. ................ 474/8 |
| 5,269,726 | A | * | 12/1993 | Swanson et al. ............. 474/28 |
| 5,295,915 | A | * | 3/1994  | Friedmann .................... 474/18 |
| 5,527,226 | A |   | 6/1996  | Lamers |

(Continued)

FOREIGN PATENT DOCUMENTS

JP    58-102855    6/1983

(Continued)

Primary Examiner—Bradley T King
Assistant Examiner—Thomas Irvin
(74) Attorney, Agent, or Firm—Oblon, Spivak, McClelland, Maier & Neustadt, L.L.P.

(57) ABSTRACT

A belt type continuously variable transmission in which a pulley shaft is supported by bearings provided at two positions that are apart from each other in an axial direction of the pulley shaft and a supply oil passage for supplying hydraulic fluid to a pulley hydraulic chamber includes a radial direction oil passage that is formed in the pulley shaft, the radial direction oil passage is formed on an outside of an area between the two positions. Also, one of the bearings is provided near the radial direction oil passage and on an outer surface side of a cylinder member whose inner surface side forms the pulley hydraulic chamber for a movable sheave that is fixed to the pulley shaft. With this structure, concentration of stress on the radial direction oil passage can be avoided, and therefore strength of the pulley shaft can be secured.

22 Claims, 4 Drawing Sheets

U.S. PATENT DOCUMENTS

| | | | | |
|---|---|---|---|---|
| 5,628,700 | A * | 5/1997 | Yamada et al. | 474/18 |
| 5,776,022 | A * | 7/1998 | Schellekens | 474/18 |
| 5,803,846 | A * | 9/1998 | Yamada et al. | 474/18 |
| 5,971,887 | A * | 10/1999 | Hattori et al. | 477/41 |
| 6,089,999 | A * | 7/2000 | Imaida et al. | 474/18 |
| 6,241,635 | B1 * | 6/2001 | Schmid et al. | 474/11 |
| 6,280,357 | B1 * | 8/2001 | Van Spijk | 474/16 |
| 6,336,878 | B1 * | 1/2002 | Ehrlich et al. | 474/28 |
| 6,336,879 | B1 | 1/2002 | Schmid et al. | |
| 6,336,880 | B1 | 1/2002 | Agner | |
| 6,443,864 | B1 * | 9/2002 | Friedmann | 474/18 |
| 6,561,934 | B2 * | 5/2003 | Kashiwase | 474/28 |
| 6,565,465 | B2 * | 5/2003 | Nishigaya et al. | 474/28 |
| 6,669,588 | B2 * | 12/2003 | Schmid | 474/18 |
| 6,712,724 | B2 * | 3/2004 | Katou | 474/28 |
| 7,241,238 | B2 * | 7/2007 | Gieles | 474/18 |
| 2001/0044350 | A1 * | 11/2001 | Nishigaya et al. | 474/18 |
| 2004/0259671 | A1 * | 12/2004 | Gieles | 474/37 |
| 2005/0090340 | A1 * | 4/2005 | Wang et al. | 474/8 |

FOREIGN PATENT DOCUMENTS

| | | |
|---|---|---|
| JP | 61-124762 | 6/1986 |
| JP | 01 283455 | 11/1989 |
| JP | 03 048148 | 5/1991 |
| JP | 11 141633 | 5/1999 |

* cited by examiner

BELT TYPE CONTINUOUSLY VARIABLE TRANSMISSION

The disclosure of Japanese patent application no. 2004-085688 filed on Mar. 23, 2004, including the specification, drawings and Abstract is incorporated herein by reference in its entirety.

BACKGROUND OF THE INVENTION

1. Field of the Invention

The invention relates to a belt type continuously variable transmission which can achieve a desired speed ratio by changing a winding radius of a belt.

2. Description of the Related Art

A belt type continuously variable transmission has been known as a transmission for a vehicle. The belt type continuously variable transmission of this type includes a primary shaft (a rotating shaft on the driving side) and a secondary shaft (a rotating shaft on the driven side) which are provided in parallel with each other; a primary pulley which is attached to the primary shaft; and a secondary pulley which is attached to the secondary shaft. Each of the primary pulley and the secondary pulley includes a fixed sheave, and a movable sheave which is movable with respect to the fixed sheave. Each movable sheave is provided so as to be movable in the axial direction and immovable in the circumferential direction with respect to the corresponding rotating shaft via a ball, a ball groove (ball spline), and the like. A substantially V-shaped pulley groove is formed between the fixed sheave and the movable sheave. An endless belt is wound on the pulley grooves of the primary pulley and the secondary pulley. A pulley hydraulic chamber for making the movable sheave come close to/move away from the corresponding fixed sheave is provided for each of the primary pulley and the secondary pulley. The hydraulic pressure of the pulley hydraulic chamber for the primary pulley and the hydraulic pressure of the pulley hydraulic chamber for the secondary pulley are controlled separately. Thus, a groove width of the pulley is changed, and therefore a belt winding radius is changed. As a result, a speed ratio of the belt type continuously variable transmission is set to a desired value, and a tension of the belt is adjusted.

Japanese Patent Application Publication JP(A) 11-141633 discloses a technology related to the above-mentioned belt type continuously variable transmission. In this belt type continuously variable transmission, oil passages for supplying hydraulic fluid to the above-mentioned pulley hydraulic chamber are formed along the axis of a pulley shaft and in the radial direction of the pulley shaft, and the radial direction oil hole is formed in a spline shaft portion of the pulley shaft on the shaft end side. The movable sheave is attached to the spline shaft portion by spline-coupling. As a result, concentration of stress that occurs in the oil hole is reduced.

According to the technology disclosed in Japanese Patent Application Publication JP(A) 11-141633, the radial direction oil hole is formed in the spline shaft portion on the shaft end side, and therefore concentration of stress that occurs in the oil hole can be reduced to a certain extent. However, since the radial direction oil hole is formed in an area between two bearings which support the pulley shaft, the pulley shaft may be deformed by a bending load due to a belt tension applied to the pulley shaft, and the stress may be concentrated on the radial direction oil hole. As a result, considering the concentration of stress, the number of the radial direction oil holes need to be reduced, a diameter of the oil hole need to be decreased, or a diameter of the pulley shaft need to be increased, which causes problems such as an increase in cost and an increase in weight.

SUMMARY OF THE INVENTION

It is an object of the invention to solve the above-mentioned problems, and provide a belt type continuously variable transmission which can avoid concentration of stress on a radial direction oil hole and which can secure strength of a pulley shaft.

According to an aspect of the invention, there is provided a belt type continuously variable transmission in which a pulley shaft is supported by bearings provided at two positions that are apart from each other in the axial direction of the pulley shaft and a supply oil passage for supplying hydraulic fluid to a pulley hydraulic chamber includes a radial direction oil passage that is formed in the pulley shaft in the radial direction of the pulley shaft. The belt type continuously variable transmission is characterized in that the radial direction oil passage is formed on the outside of an area between the two positions which are apart from each other and at which the bearings are provided.

With the above-mentioned belt type continuously variable transmission, the pulley shaft is supported by the bearings which are provided at the two positions that are apart from each other in the axial direction of the pulley shaft, and the radial direction oil passage for supplying the hydraulic fluid to the pulley hydraulic chamber is formed on the outside of the area between the two positions which are apart from each other and at which the bearings are provided. Therefore, a portion in which the radial direction oil passage of the pulley shaft is formed does not directly receive a load applied by the belt. Accordingly, concentration of stress on the radial direction oil passage does not occur, and the strength of the pulley shaft can be secured.

One of the bearings may be provided near the radial direction oil passage and on the outer surface side of a cylinder member whose inner surface side forms the pulley hydraulic chamber for a movable sheave that is attached to the pulley shaft so as to be fixed with respect to the pulley shaft in the rotational direction of the pulley shaft and so as to be slidable in the axial direction of the pulley shaft.

With the structure in which one of the bearings is provided near the radial direction oil passage and on the outer surface side of the cylinder member whose inner surface side forms the pulley hydraulic chamber for the movable sheave that is attached to the pulley shaft so as to be fixed with respect to the pulley shaft in the rotational direction of the pulley shaft and so as to be slidable in the axial direction of the pulley shaft, in addition to the above-mentioned effect, the following effect can be obtained. A reaction force against the force applied by the belt is received not by the cylinder member, but by the bearing, which makes it possible to suppress increases in size and thickness of the cylinder member.

Further, the radial direction oil passage may be located on the outer side of a spline portion, which is formed in the pulley shaft, in the axial direction of the pulley shaft. Also, the spline portion formed in the pulley shaft may be engaged with a spline portion formed in the movable sheave on the inner surface side.

The pulley hydraulic chamber may include a first hydraulic chamber, and the first hydraulic chamber may be a space formed by a back surface of the movable sheave and the cylinder member which faces the movable sheave in the axial direction of the pulley shaft; and the pulley hydraulic chamber may include a first hydraulic chamber, and the first hydraulic chamber may be a space formed by a ring-shaped member which is fixed to a back surface of the movable sheave, an inner cylindrical portion of the movable sheave, and the cylinder member which faces the movable sheave in the axial direction of the pulley shaft.

The pulley hydraulic chamber may include a second hydraulic chamber, and the second hydraulic chamber may be a space formed by an end surface of an inner cylindrical portion of the movable sheave and the cylinder member.

The cylinder member may further include a first radial direction portion which extends in the radial direction of the pulley shaft; a first cylindrical portion which extends from the first radial direction portion so as to be substantially parallel with the axis line of the pulley shaft; a second radial direction portion which extends from the first cylindrical portion along the back surface of the movable sheave in the radial direction of the pulley shaft; and a second cylindrical portion which extends from the second radial direction portion so as to be substantially parallel with the axis line of the pulley shaft.

With the belt type continuously variable transmission having the above-mentioned structure, the radial direction oil passage is located on the outer side of the spline portion, which is formed in the pulley shaft, in the axial direction. Therefore, in addition to the above-mentioned effects, the following effect can be obtained. A torsional load applied by the belt or the pulley shaft is not directly received by the portion of the pulley shaft, in which the radial direction oil passage is formed. Therefore, concentration of stress on the radial direction oil passage does not occur, and the strength of the pulley shaft can be secured.

BRIEF DESCRIPTION OF THE DRAWINGS

The above-mentioned and other features, advantages, technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail in terms of an exemplary embodiment.

Figure 1:
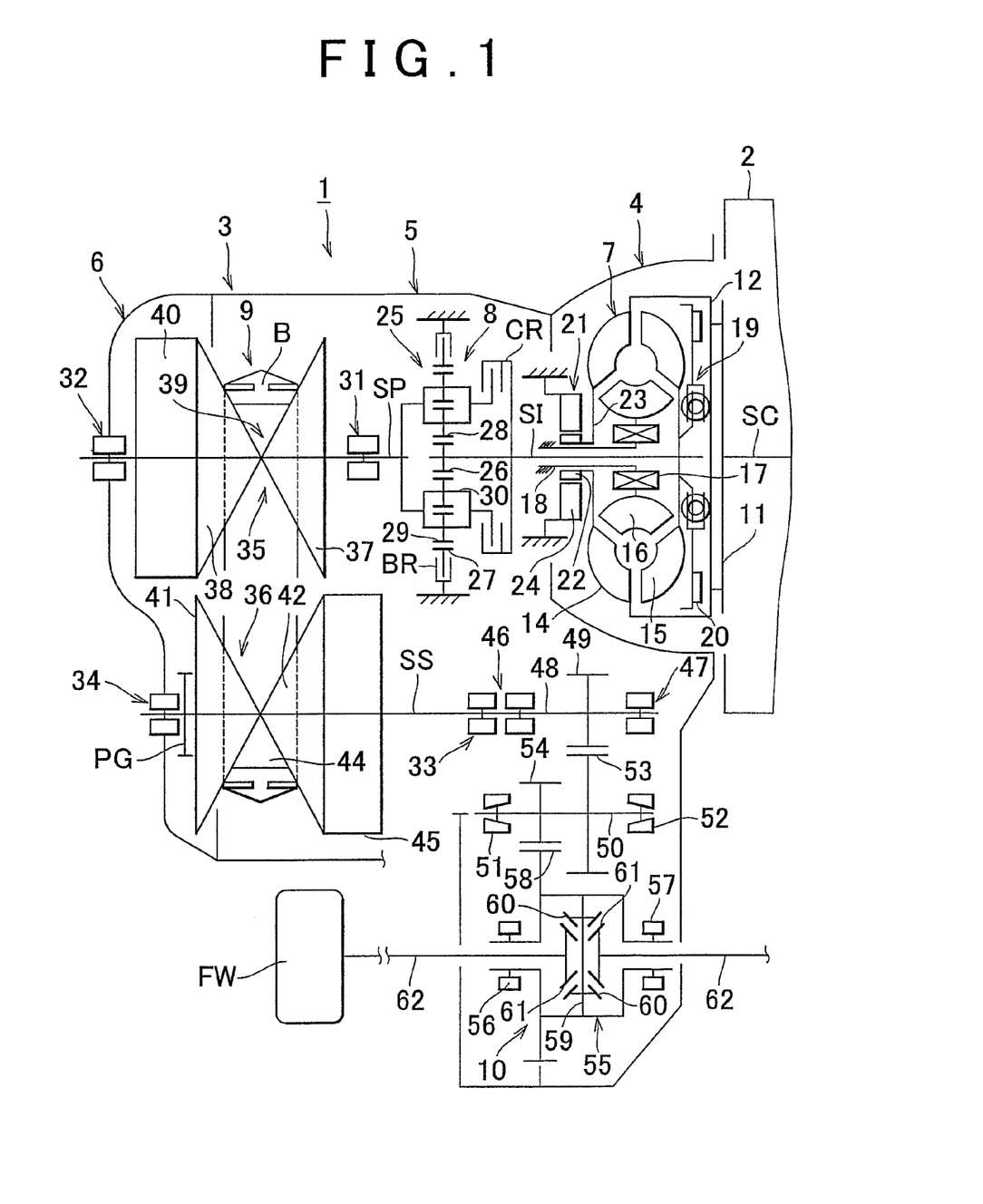
FIG. 1 is a view schematically showing part of a vehicle to which a continuously variable transmission according to the invention is applied.

FIG. 1 is a view schematically showing part of a vehicle to which a belt type continuously variable transmission according to the invention is applied. A vehicle 1 shown in FIG. 1 is configured as a so-called FF vehicle (front engine front drive: front engine front wheel drive), and includes an engine 2 serving as a drive power source. As the engine 2, a gasoline engine, a diesel engine, a LPG engine, a hydrogen engine, a bi-fuel engine or the like may be employed. In this specification, the description will be made on the assumption that a gasoline engine is used as the engine 2.

As shown in FIG. 1, the vehicle 1 includes a transaxle 3 which is provided adjacent to the transverse engine 2 and which is coupled with a crankshaft SC of the engine 2. The transaxle 3 includes a transaxle housing 4, a transaxle case 5, and a transaxle rear cover 6. The transaxle housing 4 is provided adjacent to the engine 2, and the transaxle case 5 is fixed to an open end of the transaxle housing 4, which is on the opposite side of the engine 2. Also, the transaxle rear cover 6 is fixed to an open end of the transaxle case 5, which is on the opposite side of the transaxle housing 4. A torque converter 7 is provided inside of the transaxle housing 4. A forward/reverse running changing mechanism 8, a belt type continuously variable transmission (CVT) 9 according to the invention, and a final reduction gear (differential gear) 10 are provided in the transaxle case 5 and the transaxle rear cover 6.

The torque converter 7 has a drive plate 11, and a front cover 12 which is fixed to the crankshaft SC of the engine 2 via the drive plate 11. As shown in FIG. 1, a pump impeller 14 is attached to the front cover 12. The torque converter 7 also includes a turbine runner 15 which can rotate while facing the pump impeller 14.

The turbine runner 15 is fixed to an input shaft SI which extends substantially coaxially with the crankshaft SC. In addition, a stator 16 is provided on the inner side of the pump impeller 14 and the turbine runner 15. The direction in which the stator 16 rotates is set to only one direction by a one way-clutch 17. A hollow shaft 18 is fixed to the stator 16 via the one-way clutch 17, and the input shaft SI is provided so as to penetrate the hollow shaft 18. A lock-up clutch 20 is attached to an end portion of the input shaft SI on the front cover 12 side via a damper mechanism 19.

The above-mentioned pump impeller 14, the turbine runner 15, and the stator 16 form an hydraulic fluid chamber, and hydraulic fluid is supplied to the hydraulic fluid chamber from an oil pump 21 provided between the toque converter 7 and the forward/reverse running changing mechanism 8. When the engine 2 operates and the front cover 12 and the pump impeller 14 rotate, the turbine runner 15 starts to rotate due to a flow of the hydraulic fluid in accordance with the rotation of the front cover 12 and the pump impeller 14. Also, the stator 16 changes the direction of the flow of the hydraulic fluid to the direction in which rotation of the pump impeller 14 is assisted, when the difference in the rotational speed between the pump impeller 14 and the turbine runner 15 is large.

Thus, the torque converter 7 serves as a torque amplifier when the difference in the rotational speed between the pump impeller 14 and the turbine runner 15 is large, and serves as a fluid coupling when the difference in the rotational speed becomes small. When the vehicle speed reaches a predetermined value after the vehicle 1 takes off, the lock-up clutch 20 is operated and the power transmitted from the engine 2 to the front cover 12 is transmitted to the input shaft SI mechanically and directly. Also, fluctuation of the torque transmitted from the front cover 12 to the input shaft SI is absorbed by the damper mechanism 19.

The oil pump 21 provided between the torque converter 7 and the forward/reverse running changing mechanism 8 includes a rotor 22, and the rotor 22 is connected to the pump impeller 14 via a hub 23. A body 24 of the oil pump 21 is fixed on the transaxle case 5 side. Accordingly, the power of the engine 2 is transmitted to the rotor 22 via the pump impeller 14. Then, the oil pump 21 is driven.

The forward/reverse changing mechanism 8 includes a planetary gear set 25 of a double pinion type. The planetary gear set 25 includes a sun gear 26 which is attached to an end portion of the input shaft SI on the continuously variable transmission 9 side; a ring gear 27 which is provided on the outer peripheral side of the sun gear 26 so as to be coaxial with the sun gear 26; multiple pinions 28 which are meshed with the sun gear 26; multiple pinions 29 which are meshed with both the ring gear 27 and the pinions 28; and a carrier 30 which supports the pinions 28 and 29 such that the each of the pinions can rotate on its axis, and which supports the pinions 28 and 29 such that the pinions 28 and 29 can revolve around the sun gear 26.

The carrier 30 of the forward/reverse running changing mechanism 8 is fixed to a primary shaft SP included in the belt type continuously variable transmission 9, and a power transmission path between the carrier 30 and the input shaft SI is connected/interrupted by a forward clutch CR. The forward/reverse running changing mechanism 8 includes a reverse brake BR which controls rotation/non-rotation of the ring gear 27.

The belt type continuously variable transmission 9 according to the invention includes the above-mentioned primary shaft (the rotating shaft on the driving side) SP which extends substantially coaxially with the input shaft SI, and a secondary shaft (the rotating shaft on the driven side) SS which is provided so as to be parallel with the primary shaft SP. The primary shaft SP is rotatably supported by bearings 31 and 32, and the secondary shaft SS is rotatably supported by bearings 33 and 34. A primary pulley 35 is attached to the primary shaft SP, and a secondary pulley 36 is attached to the secondary shaft SS.

The primary pulley 35 includes a fixed sheave 37 which is fixed integrally to the outer periphery of the primary shaft SP, and a movable sheave 38 which is slidably attached to the outer periphery of the primary shaft SP. The fixed sheave 37 and the movable sheave 38 face each other, and a substantially V-shaped pulley groove 39 is formed between the fixed sheave 37 and the movable sheave 38. The movable sheave 38 is movable with respect to the fixed sheave 37 in the axial direction of the primary shaft SP. The continuously variable transmission 9 includes a hydraulic actuator 40 which makes the movable sheave 38 come close to/move away from the fixed sheave 37 by moving the movable sheave 38 in the axial direction of the primary shaft SP.

Similarly, the secondary pulley 36 includes a fixed sheave 41 which is fixed integrally to the outer periphery of the secondary shaft SS, and a movable sheave 42 which is slidably attached to the outer periphery of the secondary shaft SS. The fixed sheave 41 and the movable sheave 42 face each other, and a substantially V-shaped pulley groove 44 is formed between the fixed sheave 41 and the movable sheave 42. The movable sheave 42 is movable with respect to the fixed sheave 41 in the axial direction of the secondary shaft SS. The continuously variable transmission 9 includes a hydraulic actuator 45 which makes the movable sheave 42 come close to/move away from the fixed sheave 41 by moving the movable sheave 42 in the axial direction of the secondary shaft SS.

A belt B formed of many metal pieces and multiple steel rings is wound on the pulley groove 39 of the primary pulley 35 and the pulley groove 44 of the secondary pulley 36. Then, the hydraulic pressure supplied from the hydraulic actuator 40 and the hydraulic pressure supplied from the hydraulic actuator 45 are controlled separately. Thus, the groove widths of the primary pulley 35 and the secondary pulley 36 are changed, and the winding radius of the belt B is changed. As a result, the speed ratio of the continuously variable transmission 9 is set to a desired value, and the tension of the belt B is adjusted. The bearing 34 which supports the secondary shaft SS is fixed to the transaxle rear cover 6, and a parking gear PG is provided between the bearing 34 and the secondary pulley 36.

As shown in FIG. 1, a shaft 48 which is supported by bearings 46 and 47 is coupled with the secondary shaft SS of the belt type continuously variable transmission 9. A counter drive gear 49 is fixed to the shaft 48, and power is transmitted from the belt type continuously variable transmission 9 to the final reduction gear 10 via the counter drive gear 49. The final reduction gear 10 includes an intermediate shaft 50 which is provided so as to be parallel with the secondary shaft SS. The intermediate shaft 50 is supported by bearings 51 and 52. A counter driven gear 53 which is meshed with the counter drive gear 49 of the secondary shaft SS and a final drive gear 54 are fixed to the intermediate shaft 50.

The final reduction gear 10 includes a hollow differential case 55. The differential case 55 is rotatably supported by bearings 56 and 57, and a ring gear 58 is provided on the outer peripheral side of the differential case 55. The ring gear 58 is meshed with the final drive gear 54 of the intermediate shaft 50. In addition, the differential case 55 supports a pinion shaft 59 therein, and two pinions 60 are held by the pinion shaft 59. Two side gears 61 are meshed with each of the pinions 60. Each front drive shaft 62 is connected to the side gear 61. A wheel (front wheel) FW is fixed to each drive shaft 62.

Figure 2:
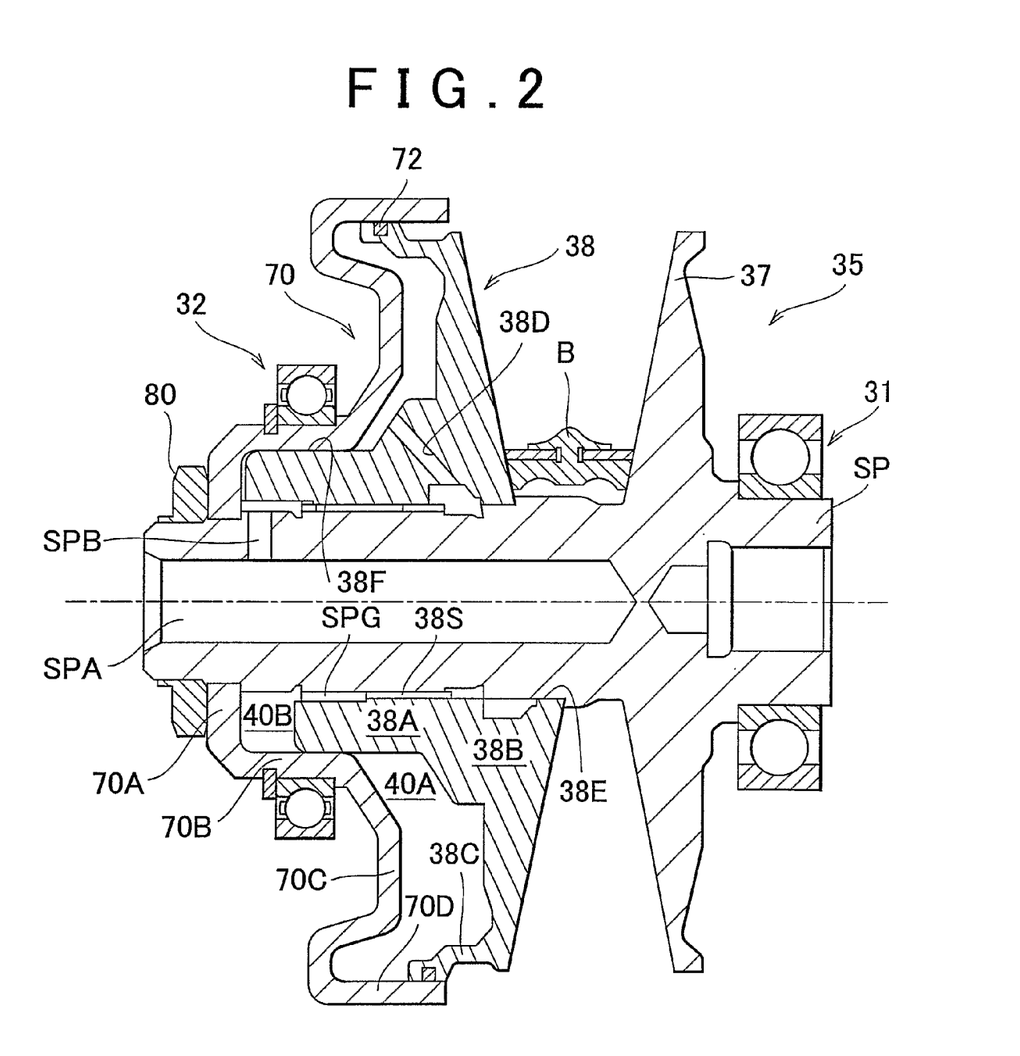
FIG. 2 is an enlarged cross sectional view showing a primary pulley side portion of the continuously variable transmission according to an embodiment of invention.

FIG. 2 is an enlarged cross sectional view showing a main portion of the belt type continuously variable transmission 9 according to the invention. FIG. 2 shows a structure related to the primary pulley 35 and the primary shaft SP of the continuously variable transmission 9. The primary shaft SP can rotate about its axis line. The fixed sheave 37 is formed integrally with one end of the primary shaft SP, and an oil passage SPA is formed inside of the primary shaft SP in the axial direction. The primary shaft SP is rotatably supported by the bearing 31 fixed to the transaxle case 5 on the outer side of the fixed sheave 37. The oil passage SPA formed inside of the primary shaft SP in the axial direction is communicated with a hydraulic circuit of a hydraulic control apparatus (not shown). Also, an oil passage SPB which extends toward the outer surface of the primary shaft SP in the radial direction of the primary shaft SP, and which is communicated with the oil passage SPA is formed in the primary shaft SP.

The movable sheave 38 has an inner cylindrical portion 38A which slides along the outer surface of the primary shaft SP; a radial direction portion 38B which extends from an end portion of the inner cylindrical portion 38A on the fixed sheave 37 side toward the outer peripheral side; and an outer cylindrical portion 38C which extends from an outer end of the radial direction portion 38B and which extends toward the bearing 32 side in the axial direction. An oil passage 38D which penetrates the inner cylindrical portion 38A from the inner surface of the inner cylindrical portion 38A to the outer surface thereof is formed in the inner cylindrical portion 38A. Communication between the oil passage 38D and the oil passage SPB is permitted through an after-mentioned spline portion formed in the outer surface of the primary shaft SP.

Namely, as shown in FIG. 2, multiple spline teeth (grooves) 38S are formed in the inner surface of the inner cylindrical portion 38A of the movable sheave 38. Also, multiple spline grooves (teeth) SPG are formed in the outer surface of the primary shaft SP which slidably supports the movable sheave 38. The spline teeth 38S and the spline grooves SPG are formed such that the tooth surface or the groove surface forms an involute curve. The primary shaft SP and the movable sheave 38 can be moved smoothly with respect to each other in the axial direction of the primary shaft. However, the primary shaft SP and the movable sheave 38 cannot be moved with respect to each other in the circumferential direction.

The radial direction oil passage SPB is located on the outer side of the spline grooves SPG, which are formed in the primary shaft SP, in the axial direction of the primary shaft SP. Thus, the radial direction oil passage SPB is located outside of the transmission path of the torque transmitted from the primary shaft SP to the belt B via the movable sheave 38. Therefore, concentration of stress on the radial direction oil passage SPB does not occur, and the strength of the primary shaft SP can be secured.

In addition, the belt type continuously variable transmission 9 includes a cylinder member 70 which is a ring-shaped partition member. As shown in FIG. 2, the cylinder member 70 includes a first radial direction portion 70A which extends in the radial direction of the primary shaft SP; a first cylindrical portion 70B which extends from the first radial direction portion 70A so as to be substantially parallel with the axis line of the primary shaft SP; a second radial direction portion 70C which extends from the first cylindrical portion 70B along a back surface of the movable sheave 38 in the radial direction of the primary shaft SP; and a second cylindrical portion 70D which extends from the second radial direction portion 70C so as to be substantially parallel with the axis line of the primary shaft SP through a curved portion corresponding to the outer cylindrical portion 38C of the movable sheave 38.

A small diameter portion located at an end of the primary shaft SP is pressed into a center hole portion formed in the first radial direction portion 70A of the cylinder member 70. The cylinder member 70 is fixed to a portion between a step portion of the primary shaft SP and a lock nut 80 by the lock nut 80. The first cylindrical portion 70B of the cylinder member 70 is rotatably supported by the bearing 32 which is fixed to the transaxle rear cover 6 by a ring-shaped bearing retainer and a bolt (not shown). Thus, as described later in detail, in the belt type continuously variable transmission 9, the primary shaft SP is rotatably supported by the bearing 32 via the cylinder member 70 (the first cylindrical portion 70B) while being supported by the bearing 31.

Also, a seal member 72 is provided in an outer peripheral portion of the outer cylindrical portion 38C of the movable sheave 38 so as to slidably contact the inner surface of the second cylindrical portion 70D of the cylinder member 70. Also, an after-mentioned second sliding portion 38F, which slidably contacts the first cylindrical portion 70B of the cylinder portion 70 on the inner surface side, is formed in an axial direction end portion of the inner cylindrical portion 38A of the movable sheave 38 on the outer surface side. Thus, the inner cylindrical portion 38A, the radial direction portion 38B, the outer cylindrical portion 38C of the movable sheave 38 and the cylinder member 70 form a first hydraulic chamber 40A which constitutes the hydraulic actuator 40. Meanwhile, the first radial direction portion 70A, the first cylindrical portion 70B of the cylinder member 70, the axial direction end portion of the inner cylindrical portion 38A of the movable sheave 38, and the primary shaft SP form a second hydraulic chamber 40B which constitutes the hydraulic actuator 40. By controlling the hydraulic pressure in the first hydraulic chamber 40A and the hydraulic pressure in the second hydraulic chamber 40B, the movable sheave 38 is moved with respect to the fixed sheave 37, and the winding radius of the belt B is changed. As a result, a desired speed ratio can be achieved.

A first sliding portion 38E and the second sliding portion 38F are provided for the movable sheave 38 so as to be apart from each other in the axial direction of the primary shaft SP. From among the two sliding portions for the movable sheave 38, the first sliding portion 38E is located on the fixed sheave 37 side with respect to the spline teeth 38S in the axial direction of the primary shaft SP, and is formed in the inner surface of the movable sheave 38. The first sliding portion 38E contacts the outer surface of the primary shaft SP. Meanwhile, the second sliding portion 38F is located, as mentioned above, so as to be apart from the first sliding portion 38E in the axial direction, and is formed in the outer surface of the axial direction end portion of the inner cylindrical portion 38A of the movable sheave 38. As shown in FIG. 2, the second sliding portion 38F contacts not the primary shaft SP, but the inner surface of the first cylindrical portion 70B of the cylinder member 70.

Figure 3:
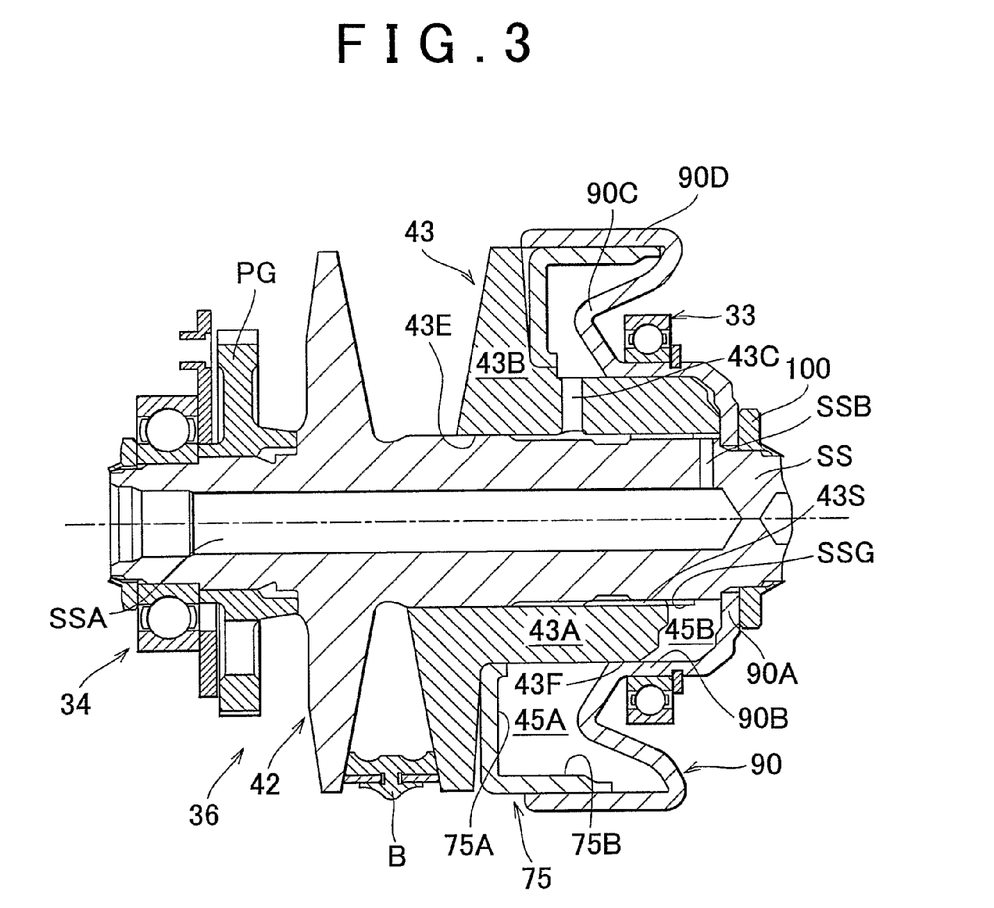
FIG. 3 is an enlarged cross sectional view showing a secondary pulley side portion of the continuously variable transmission according to the embodiment of invention.

FIG. 3 is an enlarged cross sectional view showing another main portion of the belt type continuously variable transmission 9 according to the invention. FIG. 3 shows the structure related to the secondary pulley 36 and the secondary shaft SS of the continuously variable transmission 9. The secondary shaft SS can rotate about its axis line. The fixed sheave 42 is formed integrally with an end portion of the secondary shaft SS, and an oil passage SSA is formed inside of the secondary shaft SS in the axial direction of the secondary shaft SS. The secondary shaft SS is rotatably supported, along with the parking gear PG, by the bearing 34 fixed to the transaxle rear cover 6 on the outer side of the fixed sheave 42 in the axial direction of the secondary shaft SS. The oil passage SSA formed inside of the secondary shaft SS in the axial direction of the secondary shaft SS is communicated with a hydraulic circuit of a hydraulic control apparatus (not shown). In addition, an oil passage SSB which extends toward the outer surface of the secondary shaft SS and which is communicated with the oil passage SSA is formed in the secondary shaft SS.

A movable sheave 43 has a cylindrical portion 43A which slides along the outer surface of the secondary shaft SS; and a radial direction portion 43B which extends from an end portion of the cylindrical portion 43A on the fixed sheave 42 side toward the outer peripheral side. A ring-shaped member 75 is fixed to the moving shave 43 at a back surface of the radial direction portion 43B. The ring-shaped member 75 has an outer cylindrical portion 75B which is continuous with an outer peripheral end of a radial direction portion 75A of the ring-shaped member 75 and which extends toward the bearing 33 side in the axial direction of the secondary shaft SS. An oil passage 43C which penetrates the cylindrical portion 43A from the inner surface of the cylindrical portion 43A to the outer surface thereof is formed in the cylindrical portion 43A of the movable sheave 43. Communication between the oil passage 43C and the oil passage SSB is permitted through an after-mentioned spline portion formed in the outer surface of the secondary shaft SS.

Namely, as shown in FIG. 3, multiple spline teeth (grooves) 43S are formed in the inner surface of the cylindrical portion 43A of the movable sheave 43. Also, multiple spline grooves (teeth) SSG are formed in the outer surface of the secondary shaft SS which slidably supports the movable sheave 43. The spline teeth 43S and the spline grooves SSG are formed such that a tooth surface or a groove surface forms an involute curve. The secondary shaft SS and the movable sheave 43 can smoothly move with respect to each other in the axial direction of the secondary shaft SS. However, the secondary shaft SS and the movable sheave 43 cannot move with respect to each other in the circumferential direction.

In addition, the belt type continuously variable transmission 9 includes a cylinder member 90 which is a ring-shaped partition member. As shown in FIG. 3, the cylinder member 90 includes a first radial direction portion 90A which extends in the radial direction of the secondary shaft SS; a first cylindrical portion 90B which extends from the first radial direction portion 90A so as to be substantially parallel with the axis line of the secondary shaft SS; a second radial direction portion 90C which extends from the first cylindrical portion 90B in the radial direction of the secondary shaft SS while bending toward the back surface of the movable sheave 43; and a second cylindrical portion 90D which extends from the second radial direction portion 90C so as to slidably contact the outer surface of the outer cylindrical portion 75B of the ring-shaped member 75 fixed to the movable sheave 43 and so as to be parallel with the outer cylindrical portion 75B.

A small diameter portion formed at an end portion of the secondary shaft SS is pressed into a center hole portion which is formed in the first radial direction portion 90A of the cylinder member 90. The cylinder member 90 is fixed to a portion between a step portion of the secondary shaft SS and a lock nut 100 by the lock nut 100. The first cylindrical portion 90B of the cylinder member 90 is rotatably supported by the bearing 33 fixed to the transaxle case 5. Thus, in the belt type continuously variable transmission 9, as described later in detail, the secondary shaft SS is rotatably supported by the bearing 33 via the cylinder member 90 (the first cylindrical portion 90B) while being supported by the bearing 34.

An after-mentioned second sliding portion 43F, which slidably contacts the inner peripheral side of the first cylindrical portion 90B of the cylinder member 90, is formed in the axial direction end portion of the cylindrical portion 43A of the movable sheave 43 on the outer peripheral side of cylindrical portion 43A. Thus, the cylindrical portion 43A and the radial direction portion 43B of the movable sheave 43, the ring-shaped member 75 and the cylinder member 90 form a first hydraulic chamber 45A which constitutes the hydraulic actuator 45. The first radial direction portion 90A and the first cylindrical portion 90B of the cylinder member 90, the axial direction end portion of the cylindrical portion 43A of the movable sheave 43, and the secondary shaft SS form a second hydraulic chamber 45B which constitutes the hydraulic actuator 45. By controlling the hydraulic pressure in the first hydraulic chamber 45A and the hydraulic pressure in the second hydraulic chamber 45B, the movable sheave 43 is moved with respect to the fixed sheave 42, and the winding radius of the belt B is changed. As a result, a desired shift speed can be obtained.

A first sliding portion 43E and the second sliding portion 43F are provided for the movable sheave 43 so as to be apart from each other in the axial direction of the secondary shaft SS. From among the two sliding portions for the movable sheave 43, the first sliding portion 43E is located on the fixed sheave 42 side with respect to the spline teeth 43S in the axial direction of the secondary shaft SS, and is formed in the inner surface of the movable sheave 43. The first sliding portion 43E contacts the outer surface of the secondary shaft SS. Meanwhile, the second sliding portion 43F is located, as mentioned above, so as to be apart from the first sliding portion 43E in the axial direction, and is formed in the outer surface of the axial direction end portion of the cylindrical portion 43A of the movable sheave 43. As shown in FIG. 3, the second sliding portion 43F contacts not the secondary shaft SS, but the inner surface of the first cylindrical portion 90B of the cylinder member 90. The radial direction oil passage SSB is located on the outer side of the spline grooves SSG, which are formed in the secondary shaft SS, in the axial direction of the secondary shaft SS.

Hereafter, relationships in position and force between the bearings and the radial direction oil passages according to the embodiment of the invention will be described in more detail.

In the primary pulley 35, the oil passage SPB is located outside of the area between the two positions at which the bearings 31 and 32 are provided so as to be apart from each other in the axial direction of the primary shaft SP. Similarly, in the secondary pulley 36, the oil passage SSB is located outside of the area between the two positions at which the bearings 33 and 34 are provided so as to be apart from each other in the axial direction of the secondary shaft SS. In these cases, the portion, in which the oil passage SPB is formed, in the primary shaft SP and the portion, in which the oil passage SSB is formed, in the secondary shaft SS do not directly receive the load applied by the belt. This effect can be obtained both on the primary pulley 35 side and the secondary pulley 36 side based on the same principle. Therefore, the following description will be made with reference to FIGS. 4A and 4B, by taking the primary pulley 35 side as an example. Namely, the following description will be made, with reference to FIGS. 4A and 4B, concerning the relationship in the position and force between the bearings 31 and 32 that support the primary shaft SP, which is the pulley shaft of the primary pulley 35, at the two positions apart from each other in the axial direction of the primary shaft SP, and the oil passage SPB which is the radial direction oil passage for supplying hydraulic fluid to the first hydraulic chamber 40A and the second hydraulic chamber 40B that are the pulley hydraulic chambers.

Figure 4A:
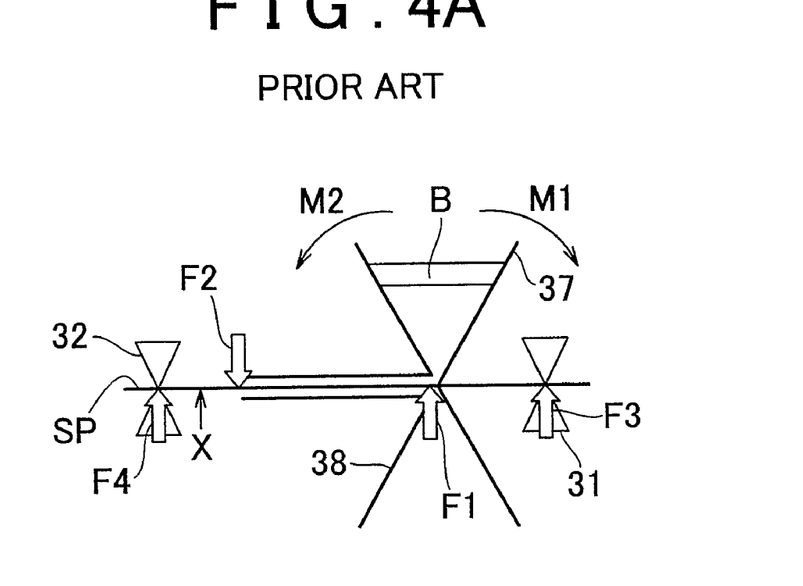
FIGS. 4A and 4B are views each of which shows how a load applied from a belt acts on a pulley shaft, FIG. 4A showing a case in which a conventional arrangement is employed, and FIG. 4B showing a case in which an arrangement according to the invention is employed.
Figure 4B:
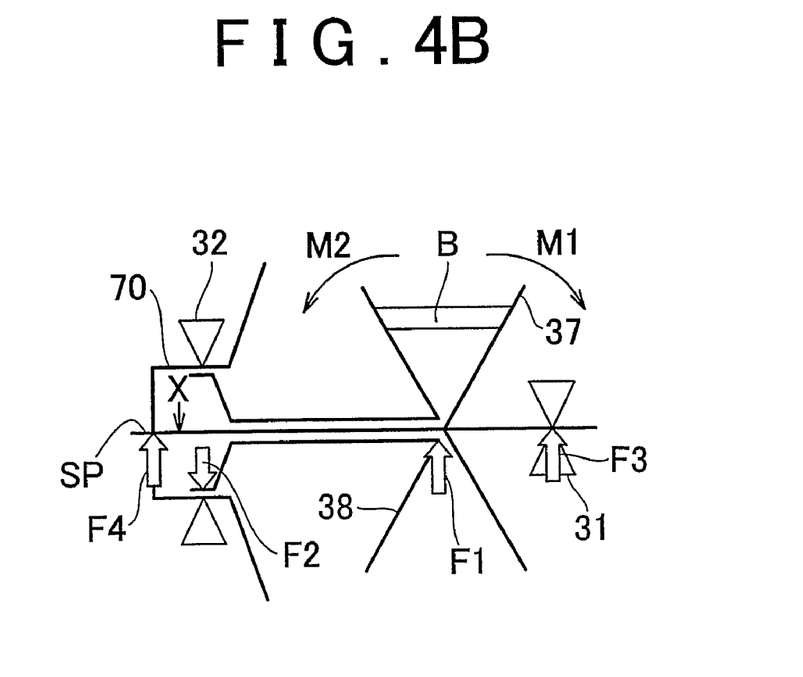

FIG. 4A is a view showing how the load applied by the belt acts on the pulley shaft in the case of the conventional arrangement in which the oil passage SPB is formed in the area between the two positions at which the bearings 31 and 32 are provided so as to be apart from each other in the axial direction of the primary shaft SP. FIG. 4B is a view showing the case of the arrangement according to the invention, in which the oil passage SPB is formed outside of the area between the two positions at which the bearings 31 and 32 are provided so as to be apart from each other in the axial direction of the primary shaft SP. In FIGS. 4A and 4B, M1 and M2 are moment forces applied from the belt B to the fixed sheave 37 and the movable sheave 38, respectively. Each of F1 and F2 is a force applied from the movable sheave 38 to the primary shaft SP which is the pulley shaft. F3 and F4 are forces applied from the primary shaft SP, which is the pulley shaft, to the bearings 31 and 32, respectively. Note that a reference character "X" shows a position in the primary shaft SP, at which the oil passage SPB is formed.

With the conventional arrangement, as shown in FIG. 4A, the forces F1 and F2 (especially, the force F2 which is applied at a position closer to the position X) for attempting to rotate the movable sheave 38 using the axis line which extends in the direction perpendicular to the pulley axis line as the center of rotation are applied to the primary shaft SP, which is the pulley shaft, due to tension of the belt, and the force F4 (reaction force) from the bearing 32 is also applied to the primary shaft SP. As a result, a large bending occurs at the position X at which the oil passage SPB is located. In contrast to this, with the arrangement according to the invention, even if the forces F1 and F2 using the axis line in the direction perpendicular to the pulley axis line as the center of rotation are applied from the movable sheave 38, as shown in FIG. 4B, the force F2 which is applied at the position closer to the position X is directly supported by the bearing 32 (via the cylinder member 70 in the above-mentioned embodiment), and is not input in the primary shaft SP that is the pulley shaft. As a result, a bending hardly occurs at the position X at which the oil passage SPB is located. Accordingly, concentration of stress on the radial direction oil passage SPB does not occur, and the strength of the pulley shaft can be secured. The above description is made concerning the structure on the primary pulley 35 side. It is needless to say that the above description can be applied to the structure on the secondary pulley 36 side.

The invention claimed is:

1. A belt type continuously variable transmission, comprising:
   a pulley shaft that is supported by a first bearing and a second bearing that are spaced apart from each other in an axial direction of the pulley shaft on opposite sides of a sheave that is supported by the pulley shaft;
   a supply oil passage that supplies hydraulic fluid to a pulley hydraulic chamber and includes a radial direction oil passage that extends in the pulley shaft in a radial direction of the pulley shaft;
   a movable sheave that is attached to the pulley shaft and that faces the sheave that is supported by the pulley shaft; and
   a cylinder member that is attached to the pulley shaft and faces the movable sheave, wherein
   the radial direction oil passage is formed in the pulley shaft outside of a portion of the pulley shaft that is between a center of the first bearing and a center of the second bearing with respect to the axial direction of the pulley shaft,
   an outer peripheral surface of an inner cylindrical portion of the movable sheave contacts and slides on an inner peripheral surface of a first cylindrical portion of the cylinder member,
   the portion of the pulley shaft that is between the center of the first bearing and the center of the second bearing with respect to the axial direction of the pulley shaft is free of any oil passages that extend in the radial direction of the pulley shaft such that any radial direction oil passage that extends in the radial direction from the pulley shaft is not provided between the center of the first bearing with respect to the axial direction of the pulley shaft and the center of the second bearing with respect to the axial direction of the pulley shaft.

2. The belt type continuously variable transmission according to claim 1, wherein the radial direction oil passage is formed in the pulley shaft outside of a portion of the pulley shaft that includes a spline portion with respect to the axial direction of the pulley shaft.

3. The belt type continuously variable transmission according to claim 2, wherein the spline portion of the pulley shaft is engaged with a spline portion formed in an inner surface side of the movable sheave.

4. The belt type continuously variable transmission according to claim 2, wherein a movable sheave oil passage extends through the movable sheave, and wherein the radial direction oil passage is in fluid communication with the movable sheave oil passage via the spline portion such that a hydraulic fluid supplied by the supply oil passage to the pulley hydraulic chamber passes through the radial direction oil passage, the spline portion, and the movable sheave oil passage.

5. The belt type continuously variable transmission according to claim 1, wherein the movable sheave is attached to the pulley shaft and is radially supported on the cylinder member in such a way that a load applied by a belt on the movable sheave is not directly applied to a portion of the pulley shaft in which the radial oil passage extends.

6. The belt type continuously variable transmission according to claim 1, wherein the outer peripheral surface of the inner cylindrical portion of the movable sheave that is attached to the pulley shaft is slidably supported on the inner peripheral surface of the first cylindrical portion of the cylinder member.

7. The belt type continuously variable transmission according to claim 1, wherein the movable sheave is attached to the pulley shaft and is radially supported on the cylinder member in such a way that a load applied by a belt on the movable sheave can be transmitted to the cylinder member.

8. The belt type continuously variable transmission according to claim 1, wherein the pulley shaft extends from a first shaft end to a second shaft end in the axial direction of the pulley shaft, wherein the first bearing is located between the first shaft end and the second bearing with respect to the axial direction of the pulley shaft and the second bearing is located between the first bearing and the second shaft end with respect to the axial direction of the pulley shaft, and wherein the radial direction oil passage is formed in the pulley shaft between the first shaft end and the first bearing with respect to the axial direction of the pulley shaft.

9. The belt type continuously variable transmission according to claim 1, wherein the pulley shaft includes a spline portion that is engaged with a spline portion formed in an inner side surface of the moveable sheave, wherein the pulley shaft extends from a first shaft end to a second shaft end in the axial direction of the pulley shaft, wherein the radial direction oil passage is located between the first shaft end and the spline portion of the pulley shaft with respect to the axial direction of the pulley shaft.

10. The belt type continuously variable transmission according to claim 9, wherein a movable sheave oil passage extends through the movable sheave from a first opening that opens to the pulley hydraulic chamber to a second opening that opens to the spline portion of the pulley shaft, and wherein the spline portion of the pulley shaft permits fluid communication between the radial direction oil passage and the movable sheave oil passage.

11. The belt type continuously variable transmission according to claim 1, wherein a spline groove portion of an outer surface of the pulley shaft includes a plurality of spline grooves extending in the axial direction of the pulley shaft, and wherein the radial direction oil passage extends radially with respect to the pulley shaft from an axial direction oil passage inside of the pulley shaft to a portion of the outer surface of the pulley shaft other than the spline groove portion.

12. The belt type continuously variable transmission according to claim 11, wherein a movable sheave oil passage extends through the movable sheave from a first opening that opens to the pulley hydraulic chamber to a second opening that opens to the spline groove portion of the pulley shaft, and wherein the radial direction oil passage is in fluid communication with the movable sheave oil passage via the spline groove portion such that a hydraulic fluid supplied by the supply oil passage to the pulley hydraulic chamber passes through the radial direction oil passage, the spline groove portion, and the movable sheave oil passage.

13. The belt type continuously variable transmission according to claim 1, wherein a spline tooth portion of an outer surface of the pulley shaft includes a plurality of spline teeth extending in the axial direction of the pulley shaft, and wherein the radial direction oil passage extends radially with respect to the pulley shaft from an axial direction oil passage inside of the pulley shaft to a portion of the outer surface of the pulley shaft other than the spline tooth portion.

14. The belt type continuously variable transmission according to claim 1, wherein any radial direction oil passage that extends in the radial direction from the pulley shaft is not provided between an outside edge of the first bearing and an outside edge of the second bearing, the outside edge of the first bearing being a portion of the first bearing that is further from the second bearing in the axial direction of the pulley shaft than any other portion of the first bearing, and the outside edge of the second bearing being a portion of the second bearing that is further from the first bearing in the axial direction of the pulley shaft than any other portion of the second bearing.

15. A belt type continuously variable transmission, comprising:
- a pulley shaft that is supported by a first bearing and a second bearing that are spaced apart from each other in an axial direction of the pulley shaft;
- a supply oil passage that supplies hydraulic fluid to a pulley hydraulic chamber and includes a radial direction oil passage that extends in the pulley shaft in a radial direction of the pulley shaft;
- a movable sheave that is attached to the pulley shaft; and
- a cylinder member that is attached to the pulley shaft and faces the movable sheave, wherein
- the radial direction oil passage is formed in the pulley shaft outside of a portion of the pulley shaft that is between a center of the first bearing and a center of the second bearing with respect to the axial direction of the pulley shaft,
- an outer peripheral surface of an inner cylindrical portion of the movable sheave contacts and slides on an inner peripheral surface of a first cylindrical portion of the cylinder member,
- the portion of the pulley shaft that is between the center of the first bearing and the center of the second bearing with respect to the axial direction of the pulley shaft is free of any oil passages that extend in the radial direction of the pulley shaft such that any radial direction oil passage that extends in the radial direction from the pulley shaft is not provided between the center of the first bearing with respect to the axial direction of the pulley shaft and the center of the second bearing with respect to the axial direction of the pulley shaft,
- wherein one of the first bearing and the second bearing is provided near the radial direction oil passage and on an outer surface side of the cylinder member, wherein an inner surface side of the cylinder member forms the pulley hydraulic chamber for the movable sheave, and wherein the movable sheave is attached to the pulley shaft so as to be fixed with respect to the pulley shaft in a rotational direction of the pulley shaft and so as to be slidable with respect to the pulley shaft in the axial direction of the pulley shaft.

16. The belt type continuously variable transmission according to claim 15, wherein the pulley hydraulic chamber includes a first hydraulic chamber, and the first hydraulic chamber is delimited at least in part by a back surface of the movable sheave and the cylinder member which faces the movable sheave.

17. The belt type continuously variable transmission according to claim 16, wherein the pulley hydraulic chamber includes a second hydraulic chamber, and the second hydraulic chamber is delimited at least in part by an end surface of the inner cylindrical portion of the movable sheave and the cylinder member.

18. The belt type continuously variable transmission according to claim 16, wherein the cylinder member includes a first radial direction portion which extends radially with respect to the pulley shaft; a first cylindrical portion which extends from the first radial direction portion substantially parallel to the axial direction of the pulley shaft; a second radial direction portion which extends radially with respect to the pulley shaft from the first cylindrical portion along the back surface of the movable sheave; and a second cylindrical portion which extends from the second radial direction portion substantially parallel to the axial direction of the pulley shaft.

19. The belt type continuously variable transmission according to claim 15, wherein the pulley hydraulic chamber includes a first hydraulic chamber, and the first hydraulic chamber is delimited at least in part by a ring-shaped member which is fixed to a back surface of the movable sheave, the inner cylindrical portion of the movable sheave, and the cylinder member which faces the movable sheave.

20. The belt type continuously variable transmission according to claim 19, wherein the pulley hydraulic chamber includes a second hydraulic chamber, and the second hydraulic chamber is delimited at least in part by an end surface of the inner cylindrical portion of the movable sheave and the cylinder member.

21. The belt type continuously variable transmission according to claim 19, wherein the cylinder member includes a first radial direction portion which extends radially with respect to the pulley shaft; a first cylindrical portion which extends from the first radial direction portion substantially parallel to the axial direction of the pulley shaft; a second radial direction portion which extends radially with respect to the pulley shaft from the first cylindrical portion along the back surface of the movable sheave; and a second cylindrical portion which extends from the second radial direction portion substantially parallel to the axial direction of the pulley shaft.

22. A belt type continuously variable transmission, comprising:
- a pulley shaft that is supported by a first bearing and a second bearing that are spaced apart from each other in an axial direction of the pulley shaft;
- a supply oil passage that supplies hydraulic fluid to a pulley hydraulic chamber and includes a radial direction oil passage that extends in the pulley shaft in a radial direction of the pulley shaft;
- a movable sheave that is attached to the pulley shaft; and
- a cylinder member that is attached to the pulley shaft and faces the movable sheave, wherein
- the radial direction oil passage is formed in the pulley shaft outside of a portion of the pulley shaft that is between a center of the first bearing and a center of the second bearing with respect to the axial direction of the pulley shaft,
- an outer peripheral surface of an inner cylindrical portion of the movable sheave contacts and slides on an inner peripheral surface of a first cylindrical portion of the cylinder member, the portion of the pulley shaft that is between the center of the first bearing and the center of the second bearing with respect to the axial direction of the pulley shaft is free of any oil passages that extend in the radial direction of the pulley shaft such that any radial direction oil passage that extends in the radial direction from the pulley shaft is not provided between the center of the first bearing with respect to the axial direction of the pulley shaft and the center of the second bearing with respect to the axial direction of the pulley shaft, wherein the first bearing and the second bearing are located on opposite sides of the movable sheave, and the portion of the pulley shaft that is between the center of the first bearing and the center of the second bearing with respect to the axial direction of the pulley shaft includes a fixed sheave and a portion of the pulley shaft that supports the movable sheave.

* * * * *